US008264473B2

(12) United States Patent
Kota

(10) Patent No.: US 8,264,473 B2
(45) Date of Patent: Sep. 11, 2012

(54) TIMING CONTROLLER, IMAGE DISPLAY DEVICE, AND RESET SIGNAL OUTPUT METHOD

(75) Inventor: Atsushi Kota, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 218 days.

(21) Appl. No.: 12/850,103

(22) Filed: Aug. 4, 2010

(65) Prior Publication Data

US 2011/0032421 A1 Feb. 10, 2011

(30) Foreign Application Priority Data

Aug. 7, 2009 (JP) ................................ 2009-185270

(51) Int. Cl.
*G06F 3/041* (2006.01)
*G09G 3/36* (2006.01)

(52) U.S. Cl. ............................ 345/173; 345/99; 345/87

(58) Field of Classification Search .................... 345/55, 345/87, 99, 204, 211–213, 94

See application file for complete search history.

(56) References Cited

U.S. PATENT DOCUMENTS 6,590,559 B2 7/2003 Takabayashi et al.

FOREIGN PATENT DOCUMENTS

JP 11-311763 A 11/1999
JP 2002-207452 A 7/2002

OTHER PUBLICATIONS

"Mini-LVDS Interface Specification", SLDA007A, Aug. 2001, Revised Jul. 2003, Texas Instruments.

*Primary Examiner* — Kent Chang
*Assistant Examiner* — Chayce Bibbee
(74) *Attorney, Agent, or Firm* — Sughrue Mion, PLLC

(57) ABSTRACT

To provide a timing controller and the like, which can display an image properly regardless of the scanning direction even when an image display device is formed by using signal-line driving ICs having residual output terminals that are not connected to the signal lines. The timing controller includes: a reset signal storage section which stores a plurality of reset signals including a normal reset signal and a specific reset signal; a reset signal setting section which sets one of the plurality of reset signals stored in the reset signal storage section for each of the plurality of ports in accordance with a signal from the outside; and a reset signal synthesizing section which synthesizes the reset signals set by the reset signal setting section and the video data, and simultaneously outputs acquired data to the plurality of ports, respectively.

9 Claims, 14 Drawing Sheets

FIG. 5A

RL="1" : FORWARD SCANNING

| RST | PORT A | PORT B | PORT C | PORT D |
|---|---|---|---|---|
| RST0 | 1Fh | 1Fh | 1Fh | 1Fh |
| RST1 | F8h | F8h | F8h | F8h |
| RST2 | 00h | 00h | 00h | 00h |
| RST3 | 00h | 00h | 00h | 00h |
| RST4 | 00h | 00h | 00h | 00h |

FIG. 5B

RL="0" : REVERSE SCANNING

| RST | PORT A | PORT B | PORT C | PORT D |
|---|---|---|---|---|
| RST0 | 00h | 1Fh | 00h | 1Fh |
| RST1 | 00h | F8h | 00h | F8h |
| RST2 | 00h | 00h | 00h | 00h |
| RST3 | 1Fh | 00h | 1Fh | 00h |
| RST4 | F8h | 00h | F8h | 00h |

TIMING CONTROLLER, IMAGE DISPLAY DEVICE, AND RESET SIGNAL OUTPUT METHOD

CROSS-REFERENCE TO RELATED APPLICATION

This application is based upon and claims the benefit of priority from Japanese patent application No. 2009-185270, filed on Aug. 7, 2009, the disclosure of which is incorporated herein in its entirety by reference.

BACKGROUND OF THE INVENTION

1. Field of the Invention

The present invention relates to a timing controller, an image display device provided with the timing controller, a reset signal output method used for the timing controller, and the like.

2. Description of the Related Art

Recently, reductions in EMI (Electro Magnetic Interference) and power consumption have been demanded due to increased scale of image display devices and increased speeds in clock and data. For fulfilling such demands, digital interfaces between timing controllers and signal-line driving circuits used in the image display devices are replaced from CMOS (Complementary Metal Oxide Semiconductor) types to differential types such as RSDS (Reduced Swing Differential Signal), mini-LVDS (Low-Voltage Differential Signaling), and the like.

The standards of the RSDS and mini-LVDS are announced from National Semiconductor Corporation and Texas Instruments, respectively. Currently, many designers use those standards for the digital interface between the timing controller and the signal-line driving circuit. "Mini-LVDS Interface Specification (SLDA007A-August 2001—Revised July 2003, TEXAS INSTRUMENTS)" is known as the mini-LVDS standard announced from Texas Instruments (Non-Patent Document 1).

FIG. 9 is a time chart showing a part of the standard disclosed in Non-Patent Document 1, in which the lateral axis is the time and the longitudinal axis is the level of each signal. Each of the signals on the longitudinal axis is clock (LV-CLKP), a signal of a video data line (LV0), and a signal of a video data line (LVi) from the top in this order. Explanations will be provided hereinafter by referring to FIG. 9.

In a case where the digital interface between a timing controller and a signal-line driving IC is the mini-LVDS, a reset signal (Reset) for driving the signal line is embedded to video data outputted from the timing controller, and transmitted on the video data line (LV0). In the format of the reset signal embedded to the video data, it becomes "Low" after last data of one line (Last Data Bit), and then becomes "Low" for one clock after "High" period ($T_{RST}$) that satisfies the specification. This timing is the reference generating position of the reset signal (Reset). From the rise of a next clock of this "Low" to the first data of a next line (First Data Bit) is fetched to the signal-line driving IC (Integrated Circuit).

FIG. 10 is a block diagram showing an image display device of Related Technique 1. FIG. 11 is a block diagram showing a signal-line driving IC of Related Technique 1. Hereinafter, explanations will be provided by referring to FIG. 10 and FIG. 11.

The image display device 50 of this case includes a display panel 51, a timing controller 52, a signal-line driving circuit 53, and a scan-line driving circuit 54. The display panel 51 is a liquid crystal display panel, and the image display device 50 is a liquid crystal display device.

Even though not shown in the drawing, the display panel 51 includes: a plurality of scan lines provided at a prescribed interval in a row direction; a plurality of signal lines provided at a prescribed interval in a column direction; liquid crystal cells which are equivalent capacitive loads provided at intersections between the signal lines and scan lines; a common electrode; TFTs (Thin Film Transistors) which drive the corresponding liquid crystal cells; and a capacitor which stores a data charge for one vertical synchronizing period. The signal-line driving circuit 53 is formed with a plurality of signal-line driving ICs 55. The scan-line driving circuit 54 is formed with a plurality of scan-line driving ICs 56. The signal-line driving IC 55 is compatible with the mini-LVDS interface.

The timing controller 52 includes a reset signal generating section 59 which generates the reset signal RST (Reset) at the timing depicted in Non-Patent Document 1 as well as a video data processing section and a timing generating section, not shown. The video data processing section processes video data Data supplied from outside. The timing generating section generates a data latch pulse signal DLP (Data Latch Pulse) and a clock signal HCK (Horizontal Clock) for the signal-line driving IC 55, generates a start pulse signal VSP (Vertical Start Pulse), a clock signal VCK (Vertical Clock), and an output enable signal VOE (Vertical Output Enable) for the scan-line driving IC 56, and generates a polarity reverse signal POL (Polarity Reverse) for AC (alternating current)-driving the liquid crystal display 51. Hereinafter, the data latch pulse signal DLP, the clock signal HCK, the start pulse signal VSP, the clock signal VCK, the output enable signal VOE, and the polarity reverse signal POL are simply referred to as a signal DLP, a signal HCK, a signal VSP, a signal VCK, a signal VOE, and a signal POL, respectively. Further, the timing controller 52 is connected to one side of the display panel 51 via FPCs (Flexible Printed Circuits) 61, 62, and a TCP (Tape Carrier Package) 63, and connected to another side of the display panel 51 via an FPC 64 and a TPC 65. Four ports A, B, C, and D are provided to the timing controller 52, and the FPCs 61, 62 are connected to the ports A, B, C, and D, respectively. The signal-line driving IC 55 is mounted to the TCP 63, and the scan-line driving IC 56 is mounted to the TCP 65. Each of the above-described signals are transmitted on the ports A, B, C, D, the FPCs 61, 62, and the TCPs 63, 65.

In FIG. 10, there are a plurality of signal-line driving ICs 55, scan-line driving ICs 56, FPCs 61, 62, and TCPs 63, 65, respectively. However, reference numerals are applied to only one each of those. Further, while the video data Data and each of the signals DLP, etc., are illustrated to be supplied directly to the TCP 63 in FIG. 10, those are actually supplied to the TCP 63 via each of the ports A, etc., and the FPCs 61, 62 as in the case of the reset signal RST.

Each signal-line driving IC 55 fetches the video data Data outputted from the timing controller 52 at the timings of the signal DLP, the signal POL, and the signal HCK outputted from the timing controller 52. Subsequently, each-signal line driving IC 55 converts the video data Data to a voltage value by each pixel of one line, and supplies the voltages thereof to corresponding pixel electrodes of one line of the display panel 51 via a drain electrode of the TFT. Note here that the TFTs, the pixel electrodes, and the like are the structural elements of the display panel 51 as described above.

Further, as shown in FIG. 11, the signal-line driving IC 55 includes a shift register section 57 and a signal-line output section 58. The output number of the signal-line driving IC 55 is "720" ch (channels). The shift register section 57 performs sequential shift actions by the reset signal RST, the signal HCK, and the signal RL supplied from the timing controller 52. The reset signal RST is embedded to the video data Data as described above. The signal RL is used for setting the shift register which determines the scanning direction. Signals SP1 and SP2 are internal signals of the signal-line driving IC 55, which are start pulse signals.

A plurality of signal-line driving ICs 55 correspond to each of the ports A-D, and the plurality of signal-line driving ICs 55 individually operate by each of the ports A-D. For example, in a case where there are three or more signal-line driving ICs 55 for a single port, the signal-line driving IC 55 operating first reads a prescribed number of data from the video data Data when there is an input of the reset signal RST, and outputs the signal SP2 to the next signal-line driving IC 55. The next signal-line driving IC 55 receives the signal SP2 as the signal SP1, and starts the same action. When the action of the last signal-line driving IC 55 is completed, each of the signal-line driving ICs 55 simultaneously output the read data to the respective signal line. In FIG. 10 and FIG. 11, the signal-line driving IC 55 shifts the action from the left to the right when the signal RL is "1" (referred to as "left-to-right forward scanning action"), and shifts the action from the right to the left when the signal RL is "0" (referred to as "left-to-right reverse scanning action").

The scan-line driving IC 56 controls all the scan lines of each of the TFTs by a unit of one line by synchronizing with the signal VCK based on the signal VSP, the signal VOE, and the signal VCK outputted from the timing controller 52. That is, the scan-line driving IC 56 sequentially makes each of the TFTs of one line from the top of FIG. 10 conductive, and applies a gradation voltage to the pixel electrodes supplied from the signal-line driving IC 55 at the time of making the TFTs conductive. Note here that the TFTs, the scan lines, the pixel electrodes, and the like are the structural elements of the display panel 51 as described above.

In FIG. 10, the display resolution of the display panel 51 is WUXGA (Wide Ultra eXtended Graphics Array: 1920×1200), the timing controller 52 is of 10-bit output with four ports, and there are eight signal-line driving ICs 55 each with output number of 720 ch. A case of left-to-right reverse scanning action under that condition will be described. In a case where the number of pixels on one line is "1920 (note that one pixel is formed with three sub-pixels)" and the output number of the signal-line driving IC 55 is 720 ch, there is no residual in the output number of the signal-line driving ICs 55 when eight signal-line driving ICs 55 are used (∵1920=720×8÷3). The timing controller 52 is of four-port outputs, so that two each of the signal-line driving ICs 55 are cascade-connected as shown in FIG. 10. The timing controller 52 generates the reset signal RST by the reset signal generating section 59.

FIG. 12 is a time chart showing a signal waveform at the time of executing the left-to-right reverse scanning according to Related Technique 1, in which the lateral axis is the time and the longitudinal axis is the levels of each signal. Each of the signals on the longitudinal axis from the top to the bottom is a clock signal (HCK), output signals of the ports A-D, and an output signal used for the explanation. Hereinafter, explanations will be provided by referring to FIG. 10—FIG. 12.

Since there is no residual in the output number of the signal-line driving ICs 55, the timing regarding the reset signal RST and the video data Data satisfies the standard of Non-Patent Document 1 even at the time of the left-to-right reverse scanning. That is, regarding the output signals of the ports A-D, the reference positions of the reset signals RST coincide with each other, and the time between the reference positions to the start of reading the video data Data also coincide with each other. This makes it possible for the image display device 50 to perform a proper display without any problems.

Next, techniques disclosed in Patent Documents will be described.

The technique disclosed in Japanese Unexamined Patent Publication Hei 11-311763 (Paragraph 009, etc.: Patent Document 1) invalidates the output of a front terminal of a source driver IC by shifting the timing at which the source driver IC reads the data through changing the timing of a start pulse inputted to the source driver IC for an appropriate number of data. Thereby, the remaining terminals of the source driver IC are distributed to the front and rear.

The technique disclosed in Japanese Unexamined Patent Publication 2002-207452 (Paragraphs 0035, 0036, etc.: Patent Document 2) equalizes the output number of the signal-line driving ICs and the input number of the display panel by turning off a part of the outputs of the signal-line driving ICs. This makes it possible to prevent the shift in the display when the scanning direction of the signal lines is reversed.

However, there is an issue in a case where not the signal-line driving IC with 720 ch but a signal-line driving IC with 414 ch is used in the image display device 50 described in FIG. 10-FIG. 12. Such signal-line driving IC is used in a case where there is only the signal-line driving IC with 414 ch that satisfies a specific electric property, in a case where it is less expensive to use the IC with 414 ch, etc. Detailed explanations will be provided hereinafter.

FIG. 13 is a block diagram showing an image display device of Related Technique 2. FIG. 3 is a block diagram showing a signal-line driving IC of Related Technique 2 (i.e., the signal-line driving IC of Related Technique 2 is in the same structure as that of a signal-line driving IC according to a first exemplary embodiment of the invention). Hereinafter, explanations will be provided by referring to FIG. 13 and FIG. 3. Same reference numerals as those of FIG. 10 and FIG. 11 are applied to the same components in FIG. 13 and FIG. 3.

In an image display device 70, the display resolution of the display panel 51 is WUXGA, the timing controller 52 is of 10-bit output with four ports, and there are fourteen signal-line driving ICs 75 each with output number of 414 ch. That is, a signal-line driving circuit 73 is formed with fourteen signal-line driving ICs 75. As shown in FIG. 3, the signal-line driving IC 75 includes a shift register section 77 and a signal-line output section 78. Other structures are the same as those of Related Technique 1 described above.

In a case where the number of pixels in the WUXGA resolution on one line is "1920" and the output number of the signal-line driving IC 75 is "414" ch, there are residuals of "36" ch in the output number of the signal-line driving ICs 55 when fourteen signal-line driving ICs 75 are used.

The residual outputs of the signal-line driving ICs 75 are not connected to the signal lines of the display panel 51, so that those are normally open-processed and become dummy terminals. Therefore, it is necessary to perform dummy-terminal processing on some of the fourteen signal-line driving ICs 75. FIG. 13 is a case where dummy processing is performed on the fourth and eleventh signal-line driving ICs 75 from the left side of the signal-line driving circuit 73. In that case, the thirty-six residual outputs are the issue in a case of left-to-right reverse scanning even though those are not an issue in a case of left-to-right forward scanning FIG. 14 is a time chart showing a signal waveform at the time of executing the left-to-right reverse scanning according to Related Technique 2, in which the lateral axis is the time and the longitudinal axis is the levels of each signal. Each of the signals on the longitudinal axis is a clock signal (HCK) and output signals of the ports A-D from the top to the bottom. Hereinafter, explanations will be provided by referring to FIG. 13, FIG. 3, and FIG. 14.

At the time of the left-to-right reverse scanning, sequential shift actions are executed from an output terminal s414 of the signal-line driving IC 75 to an output terminal s1. At this time, the eighteen outputs (six pixels) of output terminals s397-s414 of the fourth and eleventh signal-line driving ICs 75 from the left side are the dummy terminals, so that those are not connected to the display panel 51. FIG. 14 shows signal waveforms thereof.

Therefore, the first six pixels of the ports A and C of the timing controller 52 are not connected to the display panel 51, so that there is no display on those pixels. The outputs of the ports B and D are all connected to the display panel 51, so that there is a proper display provided therewith without any problems. Since the first six pixels of the ports A and C of the timing controller 52 cannot provide a display, the image display device 70 comes to provide a fault display that is shifted laterally for six pixels.

As described above, the image display device 70 formed with the timing controller 52 cannot provide a proper display with the left-to-right reverse scanning action, when there are residual outputs of the signal-line driving ICs 75 generated depending on a combination of the display resolution and the output number of the signal-line driving ICs 75. That is, the signal-line driving IC that can be used for the products of the specification where the left-to-right reverse scanning actions are essential is limited to the type with which there is no residual in the number of outputs. Thus, it lacks flexibility in terms of designing, e.g., signal-line driving ICs with still better electric property cannot be used. Further, the signal-line driving components cannot be shared with other products, which hinders a reduction in the costs.

Further, the techniques disclosed in Patent Documents 1 and 2 do not use the mini-LVDS interface standard, so that it is not possible with those to drive signal lines corresponding to that standard.

It is therefore an exemplary object of the present invention to provide a timing controller and the like, which can display an image properly regardless of the scanning direction even when an image display device is formed by using signal-line driving ICs having residual output terminals that are not connected to the signal lines.

SUMMARY OF THE INVENTION

The timing controller according to an exemplary aspect of the invention is a timing controller which outputs, via a plurality of ports, video data and a reset signal for starting reading of the video data to a plurality of signal-line driving ICs having output terminals connected to signal lines, and the timing controller includes: a reset signal storage section which stores a plurality of reset signals including a normal reset signal and a specific reset signal; a reset signal setting section which sets one of the plurality of reset signals stored in the reset signal storage section for each of the plurality of ports in accordance with a signal from outside; and a reset signal synthesizing section which synthesizes the reset signals set by the reset signal setting section and the video data, and simultaneously outputs acquired data to the plurality of ports, respectively, in a case where: the plurality of signal-line driving ICs include a normal signal-line driving IC which has only a normal output terminal connected to the signal line and a specific signal-line driving IC which has a specific output terminal that is not connected to the signal line in addition to the normal output terminal; the plurality of ports include a port which does not include the specific signal-line driving IC as an output target, and a port which includes the specific signal-line driving IC as the output target; the reset signals include the normal reset signal that is used when starting reading from the video data corresponding to the normal output terminal, and the specific reset signal that is used when starting reading from the video data corresponding to the specific output terminal; and the specific reset signal is a signal which starts the reading earlier than the normal reset signal by an amount of time which corresponds to the reading of the video data corresponding to the specific output terminal.

The image display device according to another exemplary aspect of the invention is an image display device, which includes: a display panel including the plurality of signal lines, a plurality of scan lines, pixels formed respectively at intersections between the plurality of scan lines and the plurality of signal lines; a signal-line driving circuit formed with the plurality of signal-line driving ICs; a scan-line driving circuit which outputs a scan signal to the scan lines; and the timing controller of the present invention.

The reset signal output method according to still another exemplary aspect of the invention is a reset signal output method used in a timing controller which outputs, via a plurality of ports, video data and a reset signal for starting reading of the video data to a plurality of signal-line driving ICs having output terminals connected to signal lines, and the method includes: storing a plurality of reset signals including a normal reset signal and a specific reset signal; setting one of the plurality of stored reset signals for each of the plurality of ports in accordance with a signal from outside; and synthesizing the set reset signals and the video data, and simultaneously outputting acquired data to the plurality of ports, respectively, in a case where: the plurality of signal-line driving ICs include a normal signal-line driving IC which has only a normal output terminal connected to the signal line and a specific signal-line driving IC which has a specific output terminal that is not connected to the signal line in addition to the normal output terminal; the plurality of ports include a port which does not include the specific signal-line driving IC as an output target, and a port which includes the specific signal-line driving IC as the output target; the reset signals include the normal reset signal that is used when starting reading from the video data corresponding to the normal output terminal, and the specific reset signal which is used when starting reading from the video data corresponding to the specific output terminal; and the specific reset signal is a signal which starts the reading earlier than the normal reset signal by an amount of time which corresponds to the reading of the video data corresponding to the specific output terminal.

BRIEF DESCRIPTION OF THE DRAWINGS

FIGS. 5A and 5B show charts that are tables held by a reset signal storage section according to the exemplary embodiment, in which FIG. 5A shows reset signals at the time of left-to-right forward scanning and FIG. 5B shows reset signals at the time of left-to-right reverse scanning;

DETAILED DESCRIPTION OF THE EXEMPLARY EMBODIMENTS

Figure 1:
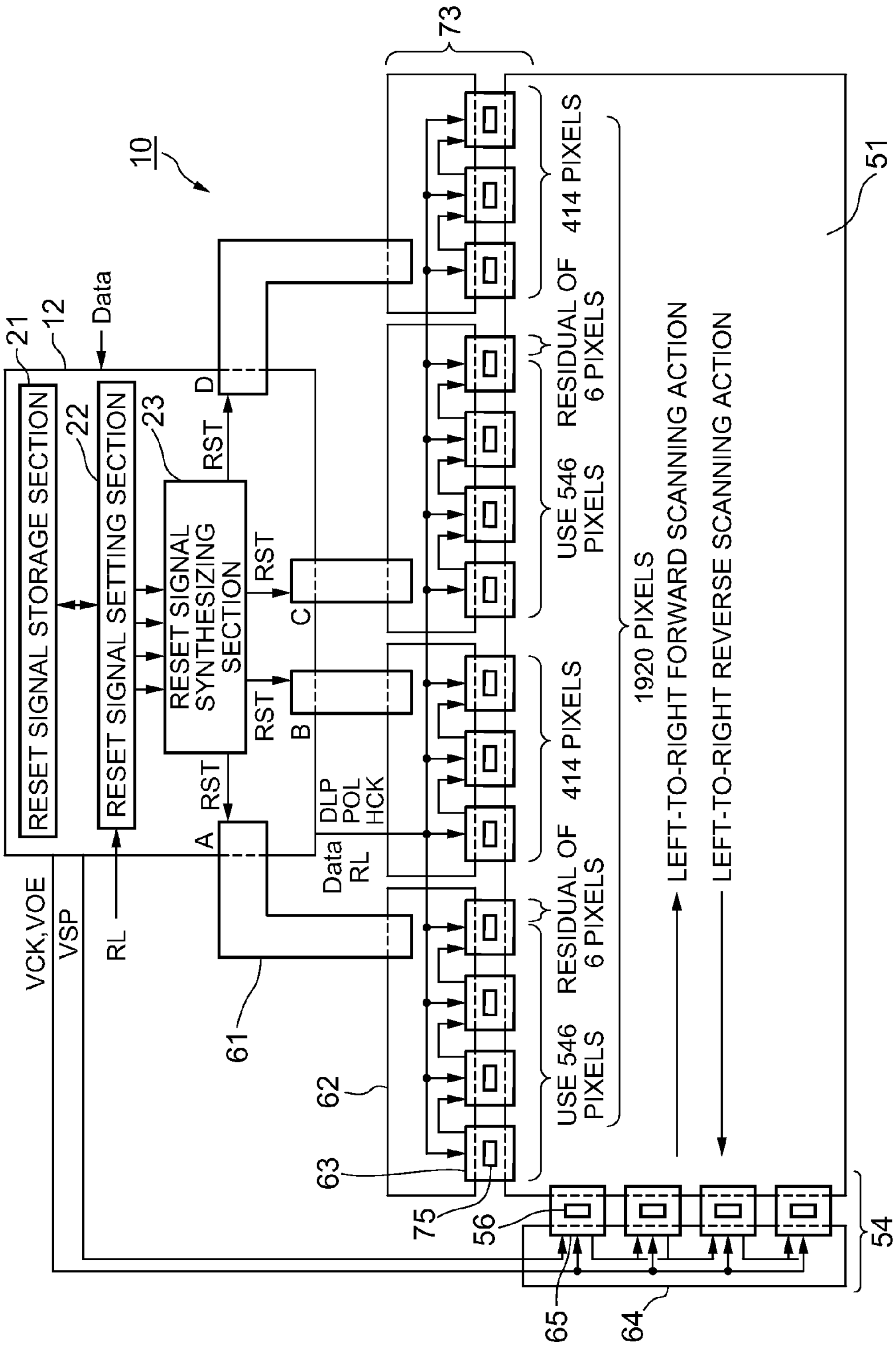
FIG. 1 is a block diagram showing an image display device according to an exemplary embodiment of the invention.
Figure 2:
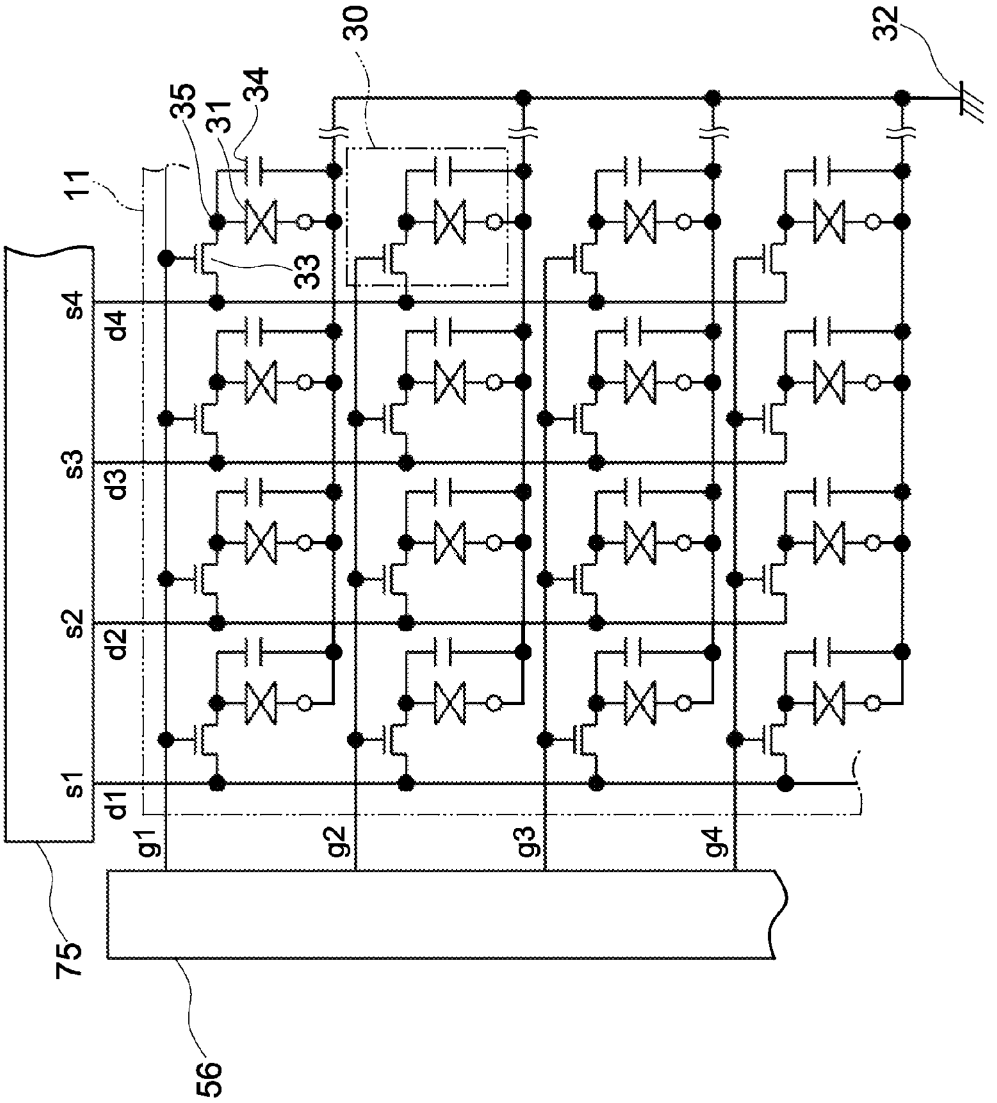
FIG. 2 is a circuit diagram showing a part of a display panel according to the exemplary embodiment.
Figure 3:
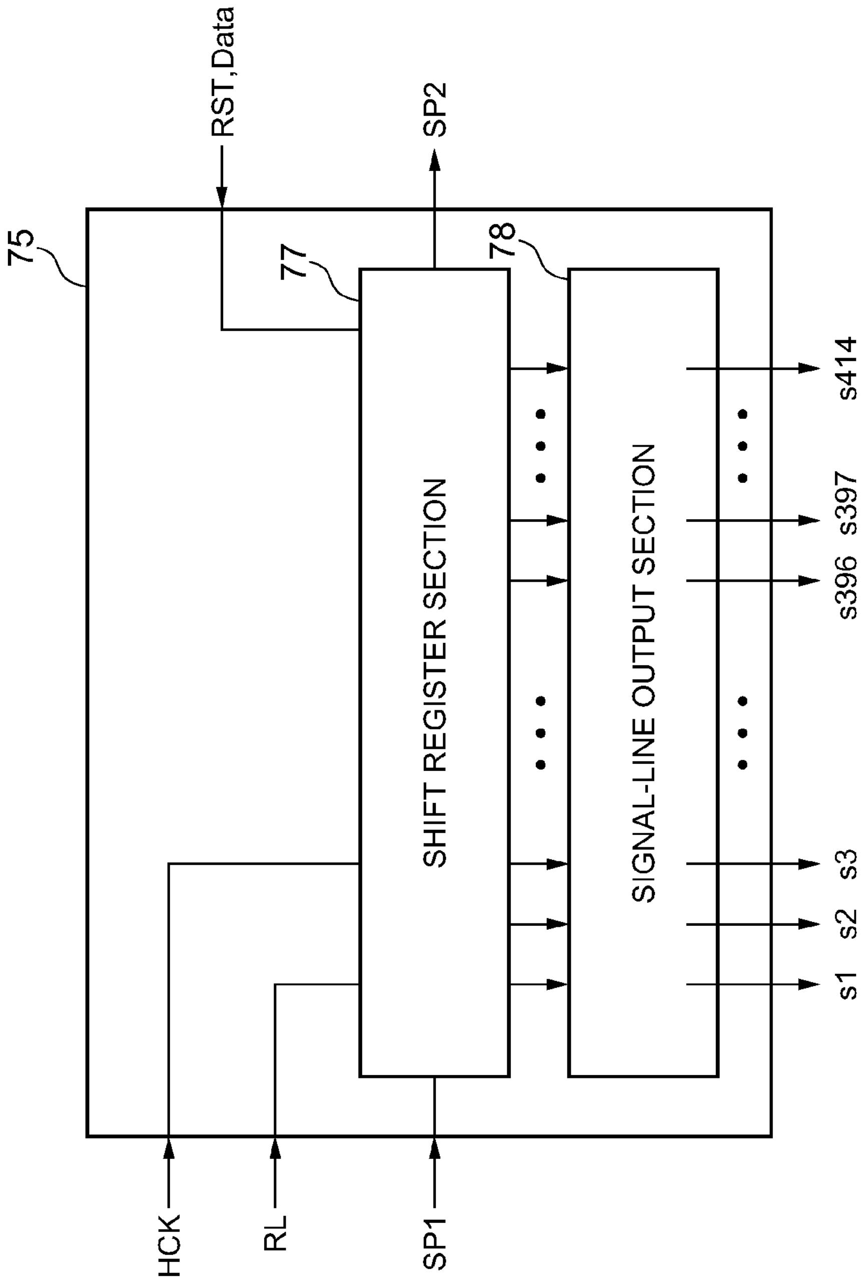
FIG. 3 is a block diagram showing a signal-line driving IC according to the exemplary embodiment.
Figure 10:
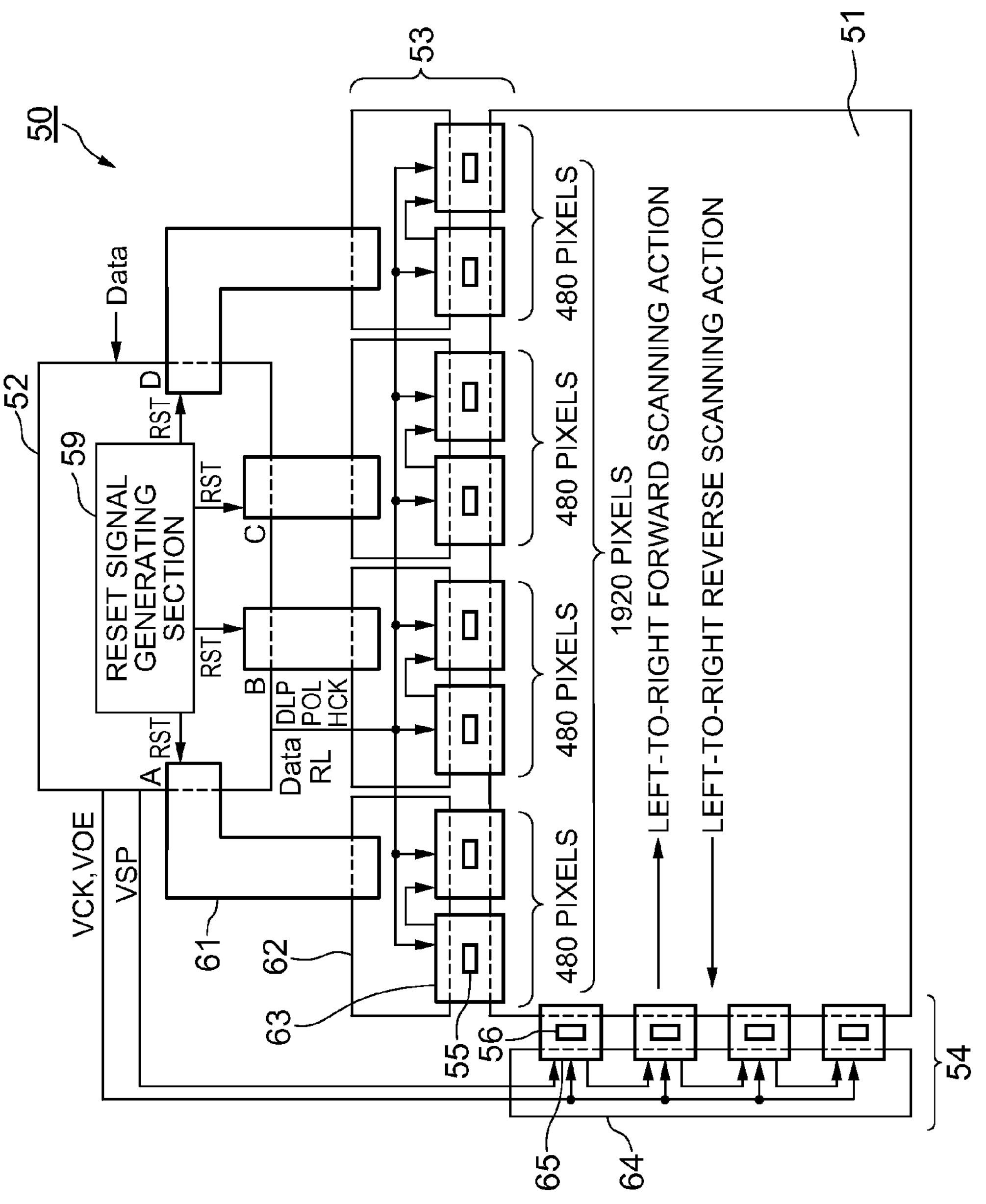
FIG. 10 is a block diagram showing an image display device of Related Technique 1.
Figure 13:
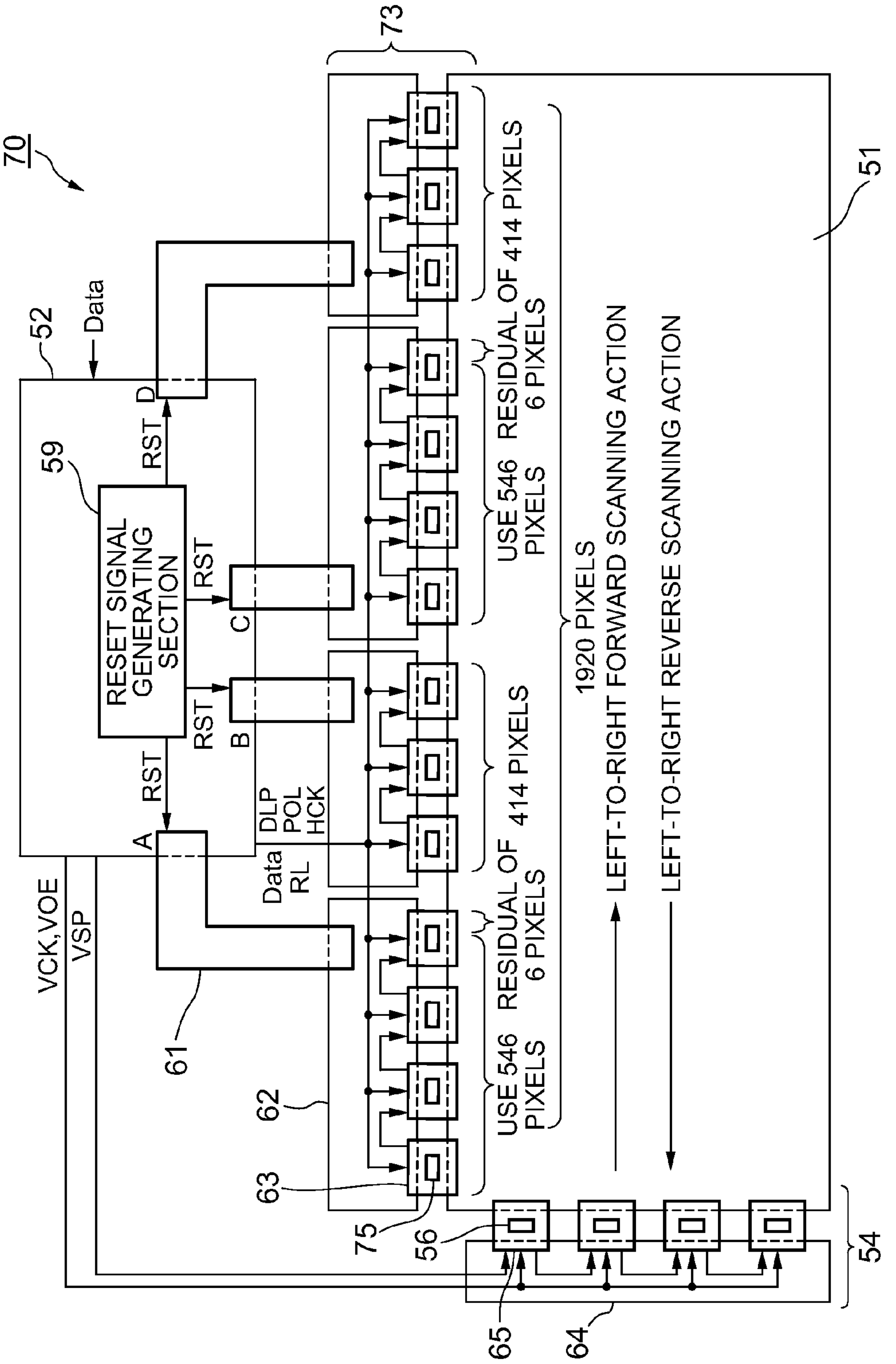
FIG. 13 is a block diagram showing an image display device according to Related Technique 2.
Figure 14:
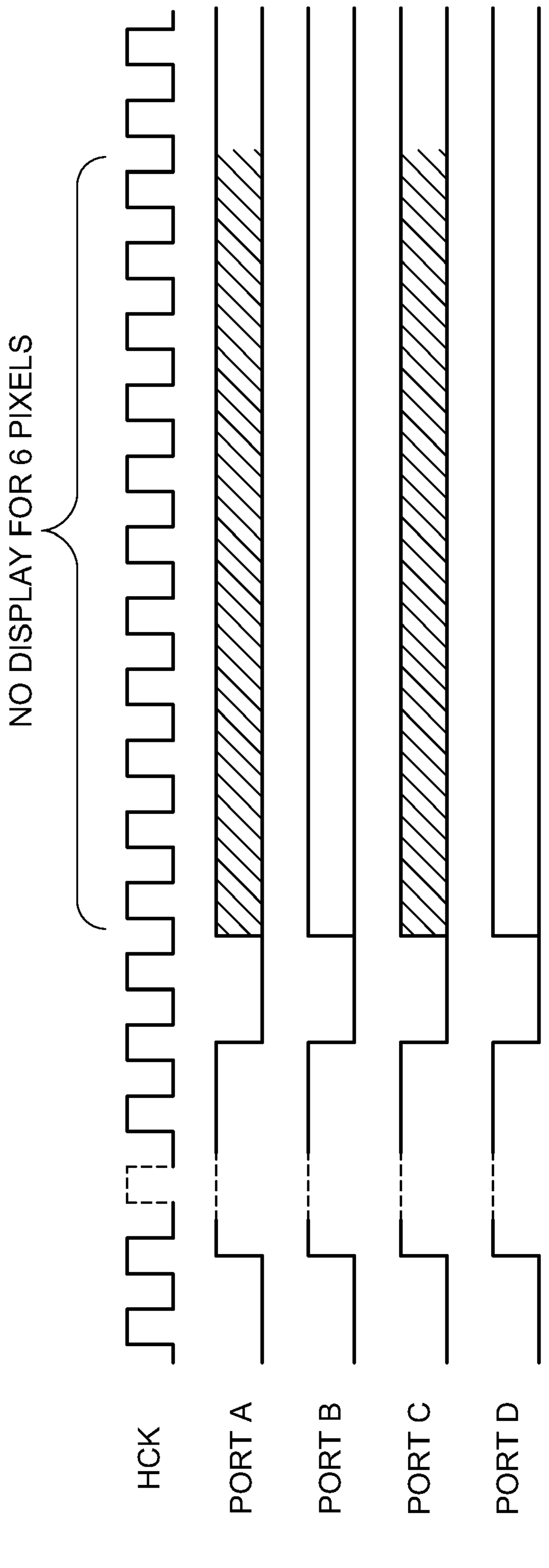
FIG. 14 is a time chart showing signal waveforms at the time of executing left-to-right reverse scanning according to Related Technique 2.

FIG. 1 is a block diagram showing an image display device according to an exemplary embodiment of the invention. FIG. 2 is a circuit diagram showing a part of a display panel according to the exemplary embodiment. FIG. 3 is a block diagram showing a signal-line driving IC according to the exemplary embodiment. Hereinafter, explanations will be provided by referring to FIG. 1, FIG. 2, and FIG. 3. Note, however, that same reference numerals as those of FIG. 10 and FIG. 13 are applied to the same components in FIG. 1, and same reference numerals as those of FIG. 1 are applied to the same components in FIG. 3.

An image display device 10 of the exemplary embodiment is characterized to include: a plurality of signal lines d1, - - - ; a plurality of scan lines g1, - - - ; a display panel 51 having sub-pixels 30 formed respectively at intersections between the signal lines d1, - - - and the scan lines g1, - - - ; a signal-line driving circuit 73 formed with a plurality of signal-line driving ICs 75; a scan-line driving circuit 54 which outputs scan signals to the scan lines g1, - - - ; and a timing controller 12 of the exemplary embodiment. In this exemplary embodiment, the image display device 10 is a liquid crystal display device, and the display panel 51 is a liquid crystal display panel. The interface standard regarding the timing controller 12 and the signal-line driving ICs 75 is mini-LVDS. Note that "pixel" in the scope of the appended claims corresponds to "sub-pixel" of this exemplary embodiment. A "pixel" in the exemplary embodiment is formed with three "sub-pixels".

The timing controller 12 according to the exemplary embodiment outputs video data Data and a reset signal RST for starting reading of the video data Data to the plurality of signal-line driving ICs 75 having output terminals s1, - - - connected to the signal line d1, - - - via ports A-D. The plurality of signal-line driving ICs 75 include normal signal-line driving ICs 75 which have only the normal output terminals s1, - - - connected to the signal lines d1, - - - , and specific signal-line driving ICs 75 which have specific output terminals s414 that are not connected to the signal lines d1, - - - in addition to having the normal output terminals s1, - - - . The ports A-D include the ports B, C which do not take the specific signal-line driving ICs 75 as the output targets, and the ports A, D which take the specific signal-line driving ICs 75 as the output targets. The reset signals RST include a normal reset signal RST used when starting reading from the video data Data corresponding to the normal output terminals s1, - - - , and a specific reset signal RST used when starting reading from the video data Data corresponding to the specific output terminals s414, - - - . Further, compared to the normal reset signal RST, the specific reset signal RST is a signal which starts the reading earlier by the amount of time corresponding to the reading of video data Data that corresponds to the specific output terminals s414, - - - .

In this case, the timing controller 12 is characterized to include: a reset signal storage section 21 which stores the plurality of reset signals including the normal reset signal RST and the specific reset signal RST; a reset signal setting section 22 which sets one of the plurality of reset signals RST stored in the reset signal storage section 21 to each of the ports A-D in accordance with the signal RL from the outside; and a reset signal synthesizing section 23 which synthesizes the reset signals RST set by the reset signal setting section 22 and the video data Data, and outputs those to each of the ports A-D simultaneously.

The signal-line driving IC 75 has four hundred fourteen output terminals s1-s414. Among the signal-line driving ICs 75 belonging to the port A, three ICs 75 on the left are the normal signal-line driving ICs 75, and the one on the right is the specific signal-line driving IC 75. This is the same for the port C. All the three signal-line driving ICs 75 belonging to each of the ports B and D are the normal signal-line driving ICs 75. Among the output terminals s1-s414 of the specific signal-line driving ICs 75, three hundred ninety-six terminals on the left are normal output terminals s1-s396, and eighteen terminals on the right are specific output terminals s397-s414. In the normal signal-line driving ICs 75, all the output terminals s1-s414 are the normal output terminals s1-s414. "Left and right" herein means the left and right on the drawing. In FIG. 1, the mutual signal directions of the signal-line driving ICs 75 show the case of a left-to-right forward scanning action. The mutual signal directions of the signal-line driving ICs 75 in the left-to-right reverse scanning action are inverted therefrom. For example, ASIC (Application Specific Integrated Circuit) or FPGA (Field Programmable Gate Array) can be used as the timing controller 12. In that case, various functions including the reset signal storage section 21, the reset signal setting section 22, and the reset signal synthesizing section 23 are designed with HDL (Hardware Description Language).

Figure 11:
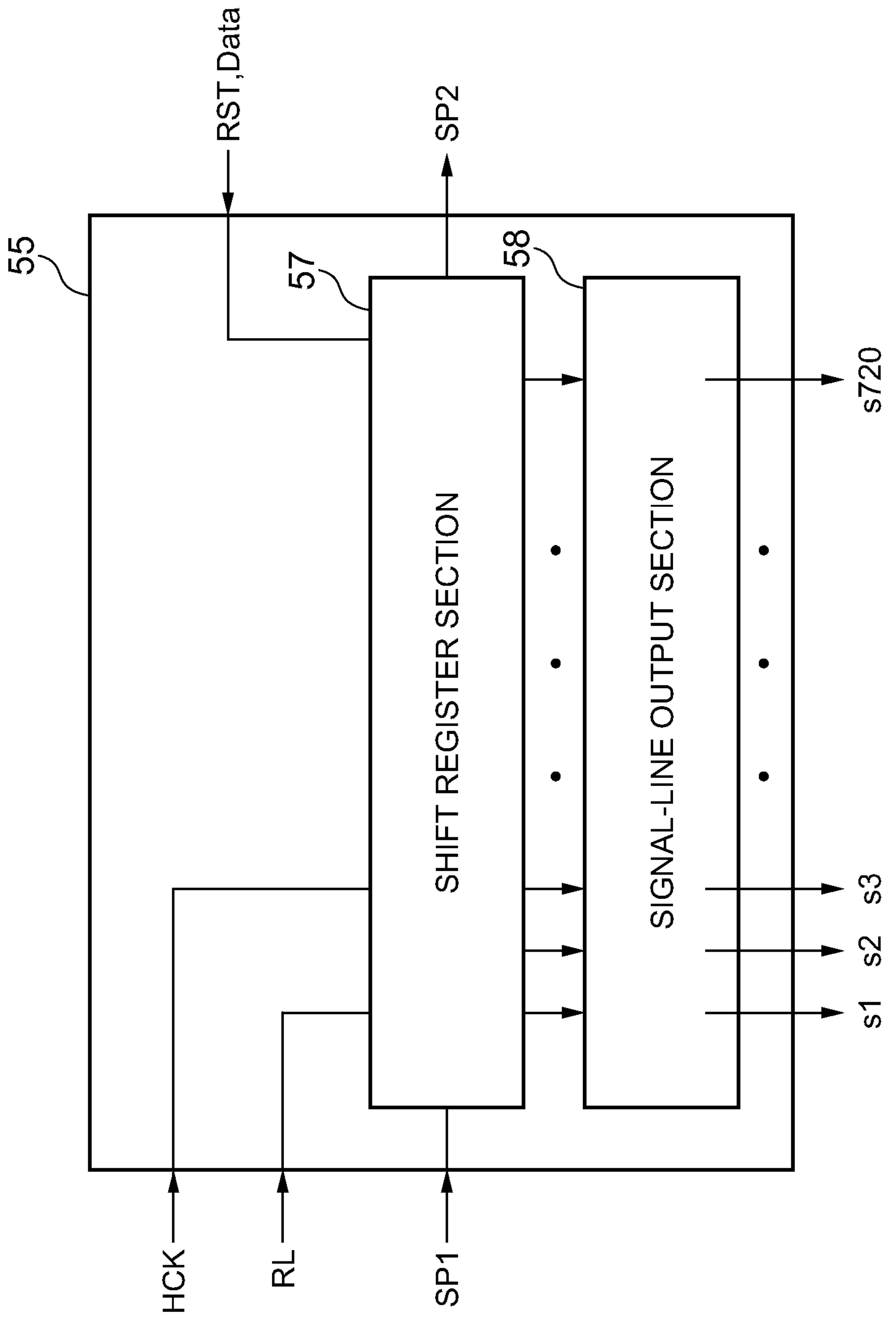
FIG. 11 is a block diagram showing a signal-line driving IC according to Related Technique 1.
Figure 12:
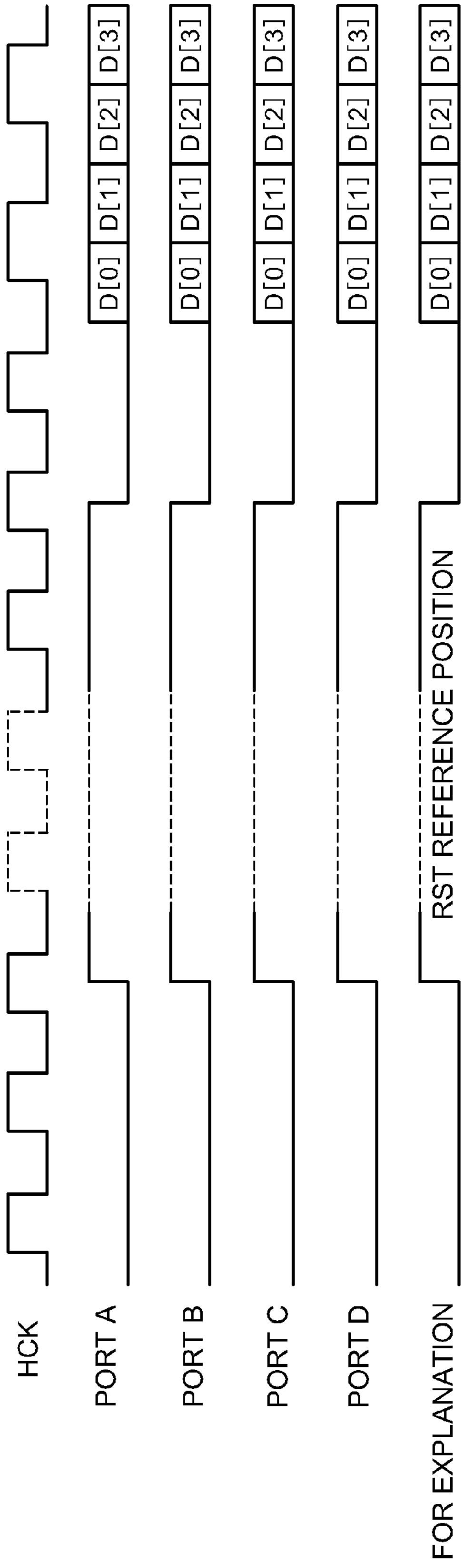
FIG. 12 is a time chart showing signal waveforms at the time of executing left-to-right reverse scanning according to the related technique 1.

Other structures of the image display device 10 are the same as those of Related Techniques 1 and 2 (FIG. 10, FIG. 11, and FIG. 13).

Next, actions of the timing controller 12 will be described. It is assumed that the signal RL from the outside for the specific signal-line driving IC 75 is a signal for starting reading from the video data Data corresponding to the specific output terminals s414, - - - . For the normal signal-line driving IC 75, this signal RL from the outside is naturally a signal which starts reading from the video data Data corresponding to the normal output terminals s1, - - - . At this time, the reset signal setting section 22 sets the specific reset signal RST for the ports A, C which include the specific signal driving IC 75 as the output target, and sets the normal reset signal RST for the ports B, D which include only the normal signal-line driving IC 75 as the output target. The reset signal synthesizing section 23 synthesizes the specific reset signal RST and the video data Data, and outputs it to the ports A, C which include the specific signal driving IC 75 as the output target. At the same time, the reset signal synthesizing section 23 synthesizes the normal reset signal RST and the video data Data, and outputs it to the ports B, D which include only the normal signal driving IC 75 as the output target. The specific signal-line driving IC 75 which starts reading first in the ports A, C starts the reading earlier than the normal signal-line driving IC 75 which starts reading first in the ports B, D by the amount of time corresponding to the reading of the video data Data which correspond to the specific output terminals s414-s397. Therefore, the time at which the specific signal-line driving IC 75 starts the reading of the video data Data corresponding to the normal output terminal s396 coincides with the time at which the normal signal-line driving IC 75 starts the reading of the video data Data corresponding to the normal output terminal s414. At this time, it is possible to display an image properly at the time of executing the left-to-right reverse scanning even when the mini-LVDS interface standard is used and the image display device 10 is formed by using the signal-line driving ICs 75 which have residual output terminals s414-s397 that are not connected to the signal lines d1, - - - , for example.

Further, the reset signal RST can be defined as follows. The reset signal RST contains a trigger part, and it is a signal for starting reading of the video data Data after a specific time has passed from the trigger part. The trigger part of the specific reset signal RST is outputted earlier than the trigger part of the normal reset signal RST by an amount of time corresponding to the reading of the video data Data which corresponds to the specific output terminals s414-s397.

At this time, even when the reset signal RST is outputted simultaneously to the plurality of signal-line driving ICs 75, the time at which the trigger part reaches the specific signal-line driving IC 75 is earlier than the time at which the trigger part reaches the normal signal-line driving ICs 75 by the amount of time corresponding to the reading of the video data Data which corresponds to the specific output terminals s414-s397. That is, the specific signal-line driving IC 75 starts the reading earlier than the normal signal-line driving ICs 75 by the amount of time corresponding to the reading of the video data Data which corresponds to the specific output terminals s414-s397. Therefore, the time at which the specific signal-line driving IC 75 starts the reading of the video data Data corresponding to the normal output terminal s396 coincides with the time at which the normal signal-line driving IC 75 starts the reading of the video data Data corresponding to the normal output terminal s414.

Further, the actions of the timing controller 12 described above can be considered as a reset signal output method. That is, the reset signal output method according to the exemplary embodiment is a reset signal output method used in the timing controller 12, which is basically characterized to: store a plurality of reset signals RST including the normal reset signals RST and the specific reset signal; set one of the plurality of stored reset signals RST by each of the ports A-D in accordance with the signal RL from the outside; synthesize the set reset signals RST and the video data Data; and simultaneously output those to the ports A-D, respectively. Other than the basic structural features, it is possible to add the actions of the timing controller 12 described above to the reset signal output method according to the exemplary embodiment as steps.

Further, the actions of the timing controller 12 described above can be implemented by a computer and a program thereof. That is, the reset signal output program according to the exemplary embodiment is a reset signal output program used for the timing controller 12. When the entire part or a part of the timing controller 12 is formed with the computer, the reset signal output program causes the computer to function as: a module (corresponds to the reset signal storage section 21) which stores a plurality of reset signals RST including the normal reset signals RST and the specific reset signal RST; a module (corresponds to the reset signal setting section 22) which sets one of the plurality of stored reset signals RST by each of the ports A-D in accordance with the signal RL from the outside; a module (corresponds to the reset signal synthesizing section 23) which synthesizes the set reset signals RST and the video data Data, and simultaneously outputs those to the ports A-D, respectively. Other than the basic modules, it is possible to add the actions of the timing controller 12 described above to the reset signal output program according to the exemplary embodiment as modules.

Figure 4:
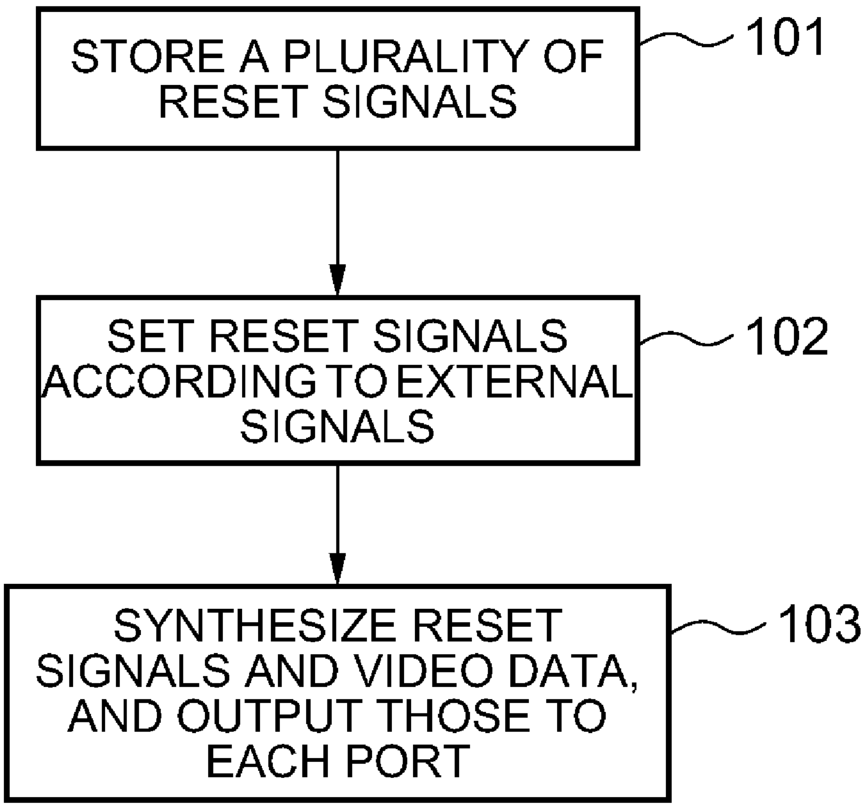
FIG. 4 is a flowchart showing processing executed by a reset signal output program according to the exemplary embodiment.

The computer used therein is a typical one which is formed with a CPU, a ROM, a RAM, an input/output interface, and the like. FIG. 4 is a flowchart showing the processing executed by the reset signal output program of the exemplary embodiment. As shown in FIG. 4, first, a plurality of reset signals RST including the normal reset signals RST and the specific reset signal RST are stored (step 101). Subsequently, one of the plurality of stored reset signals RST are set by each of the ports A-D in accordance with the signal RL from the outside (step 102). At last, the set reset signals RST and the video data Data are synthesized, and those are simultaneously outputted to the ports A-D, respectively (step 103).

Next, the exemplary embodiment will be described in more details. It is to be noted, however, that the timing controller 12 is formed with ASIC or FPGA.

FIG. 1 shows the structures of the image display device 10 and the timing controller 12 according to the exemplary embodiment. The image display device 10 is formed with the display panel 51, the timing controller 12, the signal-line driving circuit 73, and the scan-line driving circuit 54. The signal-line driving circuit 73 is formed with a plurality of signal-line driving ICs 75, and the scan-line driving circuit 54 is formed with a plurality of scan-line driving ICs 56.

As shown in FIG. 2, the display panel 51 includes: a plurality of scan lines g1, - - - provided at a prescribed interval in a row direction; a plurality of signal lines d1, - - - provided at a prescribed interval in a column direction; liquid crystal cells 31 which are equivalent capacitive loads provided at intersections between the scan lines g1, - - - and the signal lines d1, - - - ; a common electrode 32; TFTs (Thin Film Transistors) 33 which drive the corresponding liquid crystal cells 31; and a capacitor 34 which stores a data charge corresponding to the video data Data for one vertical synchronizing period. As shown in FIG. 3, the signal-line driving IC 75 includes a shift register section 77 and a signal-line output section 78.

The timing controller 12 includes: a reset signal storage section 21 which is formed with a register that can store the plurality of reset signals RST; a reset signal setting section 22 which sets the reset signal RST according to parameters such as the signal RL set from the outside for setting the left-to-right scanning, the display resolution, the output number of the signal-line driving ICs 75 to be used, and the like; and a reset signal synthesizing section 23 which synthesizes the reset signal RST and the video data Data. Further, the timing controller 12 is provided with a video data processing section and a timing generating section (not shown). In that case, the video data processing section processes the video data Data supplied from the outside. The timing generating section generates signals DLP and signals HCK for the signal-line driving ICs 75, signals VSP, signals VCK, signals VOE for the scan-line driving ICs 56, and signals POL for AC-driving the display panel 51.

The signal-line driving circuit 73 is structured by using a plurality of signal-line driving ICs 75. In the signal-line driving circuit 73, each signal-line driving IC 75 fetches the video data Data at the timings of the video data Data, the signal DLP, the signal POL, and the signal HCK outputted from the timing controller 12. Subsequently, each-signal line driving IC 75 converts the video data Data to a voltage value (gradation voltage) by each sub-pixel 30 for one line of the scan lines g1, - - - , and supplies the voltage thereof to a pixel electrode 35 via a drain electrode of the TFT 33.

The scan-line driving circuit 54 is structured by using a plurality of scan-line driving ICs 56. In the scan-line driving circuit 54, the scan-line driving ICs 56 control all the scan lines g1, - - - of each of the TFTs 33 by a unit of one line of the scan lines g1, - - - by synchronizing with the signal VCK based on the signal VSP, the signal VOE, and the signal VCK outputted from the timing controller 12. Then, the scan-line driving ICs 56 sequentially make each of the TFTs 33 for one line from the top conductive so as to apply a gradation voltage supplied from the signal-line driving ICs 75 at the time making the TFTs conductive to the pixel electrodes 35. Next, the actions of the timing controller 12 according to the exemplary embodiment will be described.

There are residuals in the output number of the signal-line driving ICs 75 depending on the combination of the pixel number of the display resolution of the display panel 51 and the output number of each of the signal-line driving ICs 75. The timing controller 12 individually sets the reset signals RST for each of the ports A-D to achieve a proper display at the time of the left-to-right scanning in such case. Hereinafter, specific actions thereof will be described by referring to the drawings.

As shown in FIG. 1, this exemplary embodiment is structured in such a manner that the display resolution is WUXGA, the timing controller 12 is of 10-bit output with four ports, and that fourteen the signal-line driving ICs 75 with 414-outputs are used. A case of executing the left-to-right reverse scanning action in that condition will be described.

FIGS. 5A and 5B show charts that are tables held by the reset signal storage section according to the exemplary embodiment. FIG. 5A shows the reset signal at the time of the left-to-right forward scanning, and FIG. 5B shows the reset signal at the time of the left-to-right reverse scanning Hereinafter, explanations will be provided based on FIG. 1 and FIG. 5.

The reset signal setting section 22 sets the reset signal RST for each of the ports A-D to either one of the values shown in FIG. 5A and FIG. 5B in accordance with the signal RL for setting the left-to-right scanning The reset signal RST is formed with five reset signals RST0-RST4. When the signal RL is “0”, it means to execute the left-to-right forward scanning action. Thus, the reset signal setting section 22 sets the reset signal RST to the value as shown in FIG. 5A. When the signal RL is “1”, it means to execute the left-to-right reverse scanning action. Thus, the reset signal setting section 22 sets the reset signal RST to the value as shown in FIG. 5B. The reset signal RST shown in FIG. 5A can be set as an initial value in the register (i.e., the reset signal storage section 21) within the timing controller 12 based on the combination of the resolution, the number of outputs of the signal-line driving ICs 75, the number of ports of the timing controller 12, and the like. Further, the value in the register can be changed depending on whether it is used for serial communication, I2C (Inter-Integrated Circuit) communication, or the like.

Figure 6:
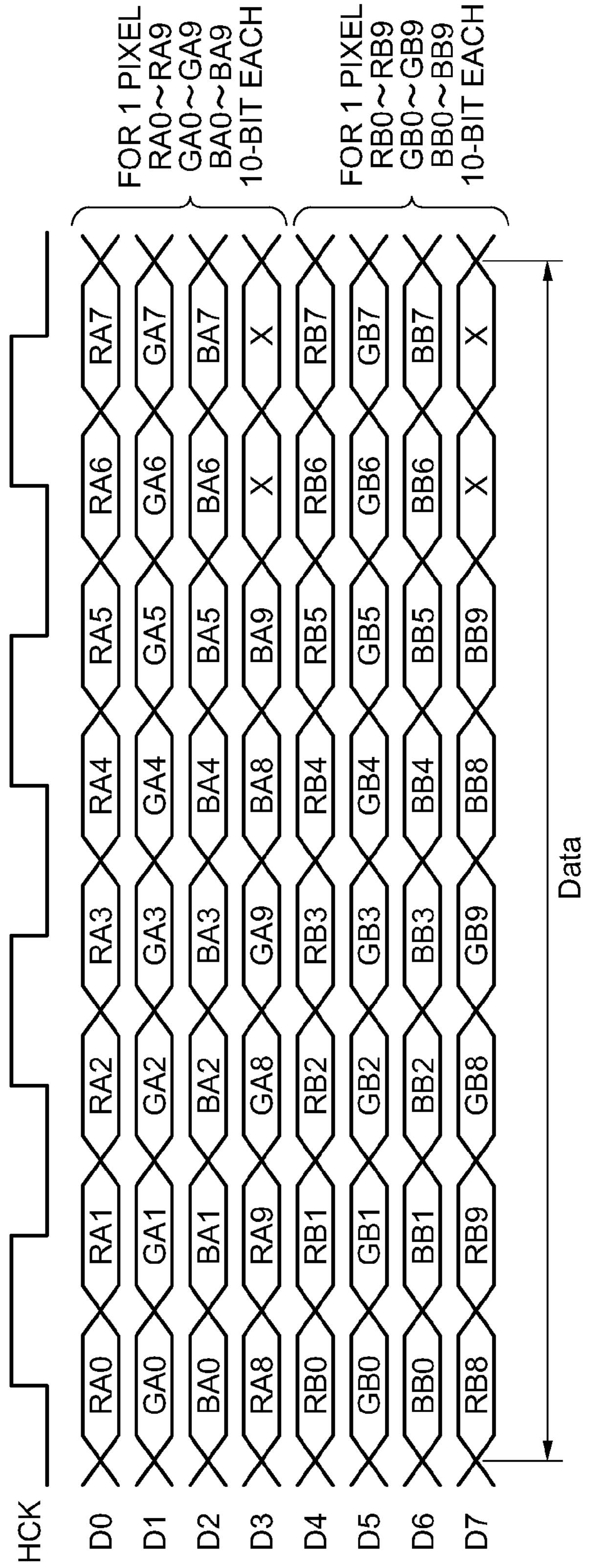
FIG. 6 is a time chart showing a data format of mini-LVDS according to the exemplary embodiment.
Figure 7:
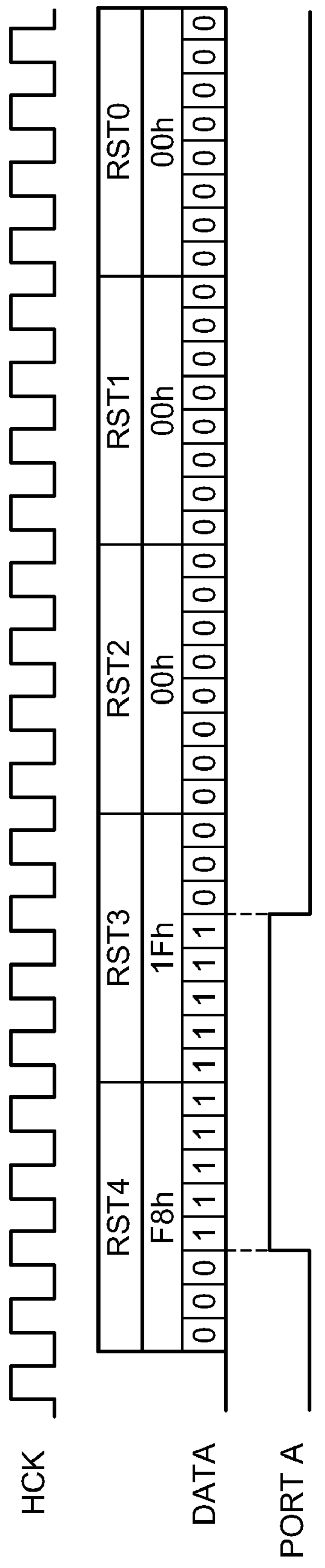
FIG. 7 is a time chart showing an example of the reset signal according to the exemplary embodiment.
Figure 8:
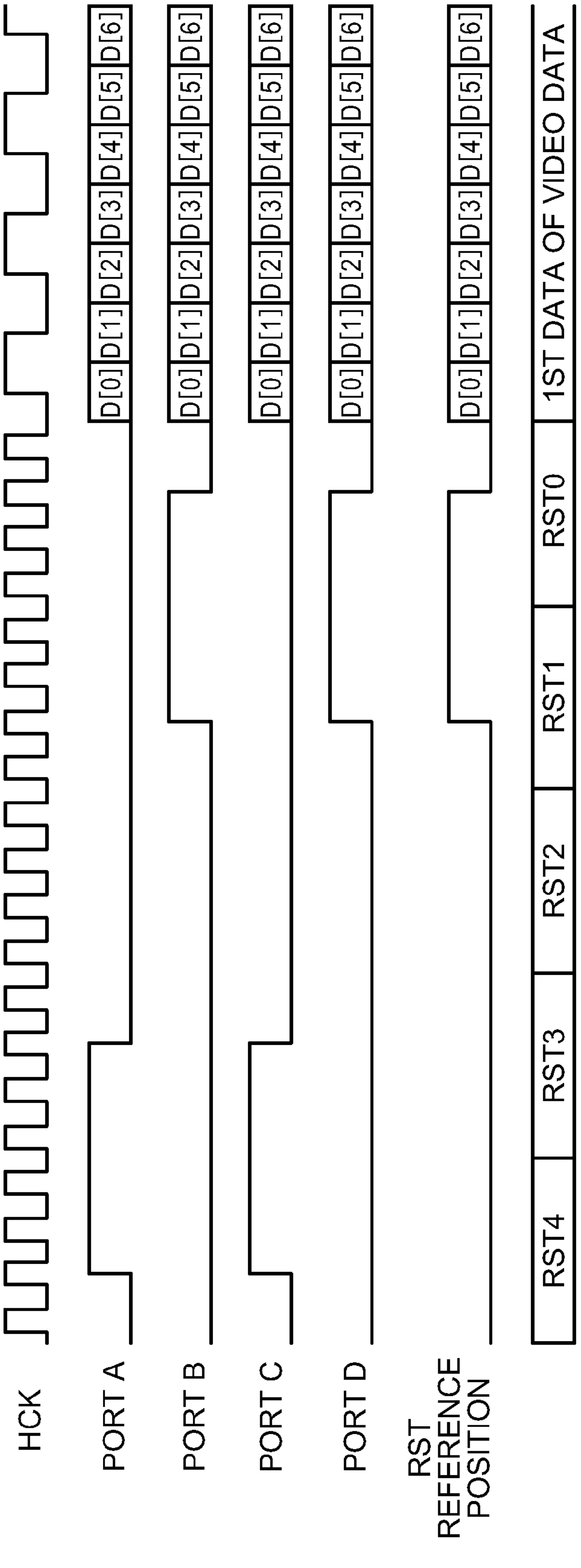
FIG. 8 is a time chart showing synthesized reset signal and video data according to the exemplary embodiment.
Figure 9:
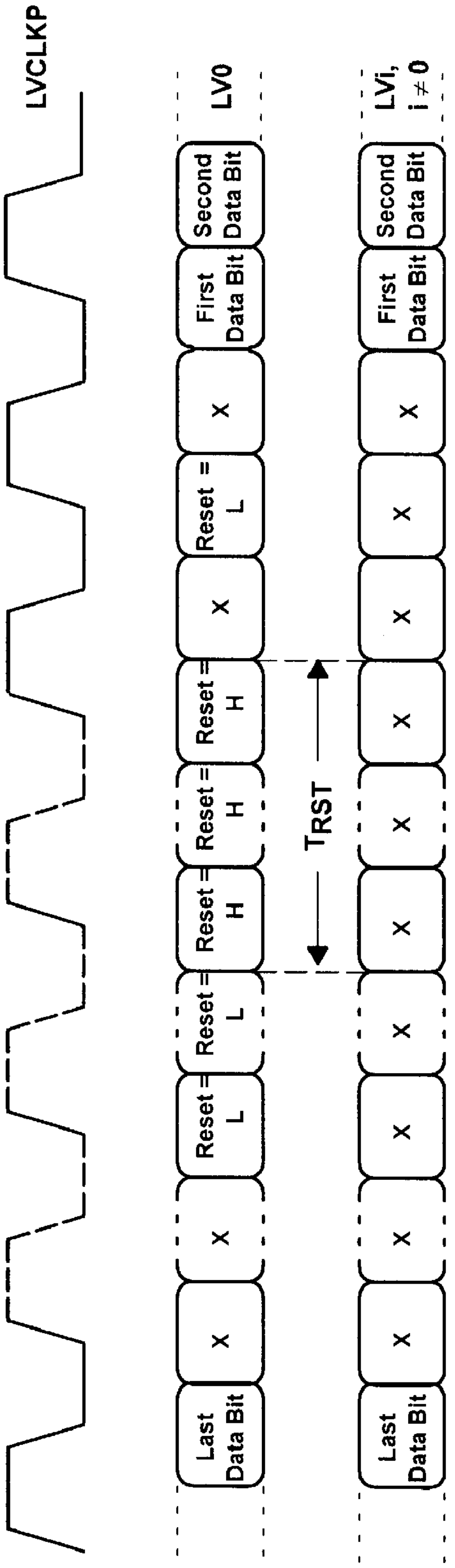
FIG. 9 is a time chart showing a part of the standard of Non-Patent Document 1.

FIG. 6 is a time chart showing a data format of the mini-LVDS according to the exemplary embodiment. FIG. 7 is a time chart showing an example of the reset signal according to the exemplary embodiment. FIG. 8 is a time chart showing synthesized reset signal and video data according to the exemplary embodiment. In FIG. 6-FIG. 8, the lateral axis is the time and the longitudinal axis is the waveform or value of each signal. Hereinafter, explanations will be provided by referring to FIG. 1-FIG. 8.

Now, the data format of the mini-LVDS will be described. As shown in FIG. 6, the data format of the 10-bit mini-LVDS is designed to transmit two pixels of data with 10-bit each of RGB (Red Green Blue) with four pulses of signal HCK by using eight pairs of data lines D0-D7. Next, a method for generating the reset signal RST will be described. For example, as shown in FIG. 5B, when the signal RL is “0”, each of the reset signals RST4-RST0 which configure the reset signal RST of the port A are F8h, 1Fh, 00h, 00h, and 00h, respectively. Therefore, the data of the reset signal RST of the port A becomes as follows based on the data format: 0001_1111, 1111_1000, 0000_0000, 0000_0000, 0000_0000. This can be expressed in a waveform as in FIG. 7. The part shown with “1” in FIG. 7 is the trigger part of the reset signal RST.

In this manner, the reset signal synthesizing section 23 synthesizes the reset signals RST each being formed with five reset signals RST4-RST0 at the pre-stage of the 1st data of the video data Data in each of the ports A-D, as shown in FIG. 8.

In the exemplary embodiment, as shown in FIG. 8, the trigger part of the reset signal RST of the ports A and C at the time of the left-to-right reverse scanning (RS=“0”) is generated and outputted earlier by six pixels (twelve pulses of the signal HCK) from the generating position of the reference trigger part (referred to as “RST reference position” hereinafter). The trigger part of the reset signal RST of the ports B, D is generated and outputted at the same position as the generating position of the RST reference position.

In the signal-line driving circuit 73, the output terminals s397- s414 of the fourth and eleventh signal-line driving ICs 75 from the left are not connected to the signal lines d1, - - - . Thus, the eighteen residual output terminals s397-s414 are dummy-driven through shifting the reset signal RST of the corresponding ports A and C by six pixels. Immediately thereafter, the output terminals s396, - - - connected to the signal lines d1, - - - are shifted sequentially. The trigger part of the reset signal RST of the ports B and D corresponding to the signal-line driving ICs 75 that have no residual output terminal does not need to be shifted from the RST reference position. In this manner, it becomes possible to provide a proper display by executing the left-to-right reverse scanning action of effective one thousand and nine hundred twenty pixels without any problem.

Further, at the time of the left-to-right forward scanning, sequential driving is executed from the output terminals s1, - - - connected to the signal lines d1, - - - . Thus, there is no influence of the residuals of the output terminals s1, - - - of the signal-line driving ICs 75. Therefore, a proper display can be provided by generating the trigger part of the reset signal RST at the time of the left-to-right forward scanning at the same position as the RST reference position.

As described above the timing controller 12 individually sets the reset signal RST for the each of the ports A-D even when there are residuals in the outputs of the signal-line driving ICs 75 generated due to the combination of the pixel number of the display panel 51 and the output number of the signal-line driving ICs 75. Therefore, it is possible to provide a proper display easily even at the time of executing the left-to-right reverse scanning.

Next, the exemplary embodiment will be summarized. An object of the timing controller 12 according to the exemplary embodiment is to make it possible to provide a proper display at the time of the left-to-right reverse scanning, even when there are residuals in the outputs of the signal-line driving ICs

75 due to the combination of the display resolution of the image display device 10 and the output number of the signal-line driving ICs 75 that are compatible with the mini-LVDS interface. As a means for achieving the object, the exemplary embodiment includes, within the timing controller 12: the reset signal setting section 22 which sets the reset signal RST in accordance with the pixel number of the display resolution and the output number of the signal-line driving ICs 75; and the reset signal synthesizing section 23 which synthesizes the reset signal RST and the video data Data. Note here that the image display device 10 having an arbitrary number of pixels of the display resolution is formed with the display panel 51, the timing controller 12, the signal-line driving circuit 73 formed with a plurality of signal-line driving ICs 75 with an arbitrary number of signal-line outputs, and the scan-line driving circuit 54. Thus, the timing controller 12 individually sets inside thereof the reset signals RST for each of the ports A-D, and the reset signal generating section 23 individually generates the reset signals RST for each of the ports A-D. This makes it possible to provide a proper display easily even at the time of the left-to-right reverse scanning In other words, the timing controller 12 according to the exemplary embodiment is characterized to include the reset signal setting section 22 which sets the reset signal RST in accordance with the pixel number of the display resolution and the output number of the signal-line driving ICs 75 to be used and the reset signal synthesizing section 23 which synthesizes the reset signal RST and the video data Data for making it possible to provide a proper display at the time of the left-to-right reverse scanning even when there are residuals in the outputs of the signal-line driving ICs 75 compatible with the mini-LVDS interface generated in the image display device 10.

Next, the effects based on the structure of the exemplary embodiment will be described in details. The reset signal RST synthesized with the video data Data. As a result, the reset signal RST is embedded to the video data Data. In the case of the timing controller 52 of Related Technique 2 (FIG. 13), the timing of the reset signal RST and the video data Data is fixed. Therefore, the timing controller 52 (FIG. 13) cannot provide a proper display at the time of the left-to-right reverse scanning, in a case where there are residuals generated in the outputs of the signal-line driving ICs 75 due to the combination of the pixel number of the display panel 51 and the output number of the signal-line driving ICs 75.

In the meantime, it is possible with the timing controller 12 according to the exemplary embodiment to provide a proper display easily even at the time of the left-to-right reverse scanning, since the reset signal setting section 22 individually sets the reset signals RST for each of the ports A-D and the reset signal synthesizing section 23 individually generates the reset signals RST for each of the ports A-D even when there are residuals in the outputs of the signal-line driving ICs 75 generated due to the combination of the pixel number of the display panel 51 and the output number of the signal-line driving ICs 75. Thereby, the left-to-right reverse scanning action that cannot be done with Related Technique 2 can be executed with the exemplary embodiment, so that the versatility in the layout of the members in designing an image display device can be improved. Further, the exemplary embodiment makes it possible to use the signal-line driving IC 75 with 414-outputs having still better output property, which cannot be used in WUXGA resolution with Related Technique 2. Therefore, the display quality of the image display device can be improved. Furthermore, the exemplary embodiment makes it possible to use the signal-line driving IC 75 with 414-outputs which cannot be used with the related technique 2, so that the members of the signal-line driving ICs 75 can be shared and the cost can be decreased. Therefore, it is possible to provide low-priced products to end users. As an exemplary advantage according to the invention, the present invention makes it possible to adjust the time at which a specific signal-line driving IC starts to read the video data corresponding to the normal output terminal to coincide with the time at which a normal signal-line driving IC starts to read the video data corresponding to the normal output terminal by making the specific signal-line driving IC start the reading earlier than the normal signal-line driving IC by the amount of time corresponding to the reading time of the video data corresponding to the specific output terminal. Therefore, it is possible to display an image properly regardless of the scanning direction even when the image display device is formed by using the signal-line driving ICs having the residual output terminal that is not connected to the signal lines.

While the present invention has been described by referring to the exemplary embodiment, the present invention is not limited only to the exemplary embodiment described above. Various changes and modifications occurred to those skilled in the arts can be applied to the structures and details of the present invention. For example, the mini-LVDS data format is not limited to be of 10-bit but can also be of 8-bit, for example. Further, the interface is not limited to the mini-LVDS but an interface of any format can be used as well, as long as it is a type that synthesizes the reset signal to the video data to be supplied to the signal lines. Furthermore, the present invention can be applied even to a case where the display becomes a fault display at the time of the left-to-right forward scanning That is, it is a case where a residual output terminal of the signal-line driving ICs becomes the first target of the left-to-right forward scanning. Further, the display panel is not limited only to the liquid crystal display panel but an organic EL (Electro Luminescence) display panel or an LED (Light Emitting Diode) display panel can also be used. That is, the image display device can be an organic EL display device, an LED display device, or the like.

The present invention can also be expressed as follows.

(1) A timing controller including a video data processing section which processes video data supplied from outside an image display device and a timing generating section which generates each control signal based on the processed result, wherein reset signals RST of each port are individually set and displayed according to the signal RL in the left-to-right scanning direction setting set from the outside, the display resolution, and the output number of the signal-line driving ICs to be used.

(2) An image display device control method for controlling the image display device, wherein the reset signals RST of each port are individually generates and displayed.

(3) An image display device characterized to include the timing controller of (1).

A part or a whole part of the exemplary embodiment described above can be depicted as in following "Supplementary Notes", even though it is to be noted that the exemplary embodiment is not limited only to the followings.

(Supplementary Note 1) A timing controller which outputs, via a plurality of ports, video data and a reset signal for starting reading of the video data to a plurality of signal-line driving ICs having output terminals connected to signal lines, and the timing controller includes: a reset signal storage section which stores a plurality of reset signals including a normal reset signal and a specific reset signal; a reset signal setting section which sets one of the plurality of reset signals stored in the reset signal storage section for each of the plurality of ports in accordance with a signal from outside; and a reset signal synthesizing section which synthesizes the reset signals set by the reset signal setting section and the video data, and simultaneously outputs acquired data to the plurality of ports, respectively, in a case where: the plurality of signal-line driving ICs include a normal signal-line driving IC which has only a normal output terminal connected to the signal line and a specific signal-line driving IC which has a specific output terminal that is not connected to the signal line in addition to the normal output terminal; the plurality of ports include a port which does not include the specific signal-line driving IC as an output target, and a port which includes the specific signal-line driving IC as the output target; the reset signals include the normal reset signal that is used when starting reading from the video data corresponding to the normal output terminal, and the specific reset signal that is used when starting reading from the video data corresponding to the specific output terminal; and the specific reset signal is a signal which starts the reading earlier than the normal reset signal by an amount of time which corresponds to the reading of the video data corresponding to the specific output terminal.

(Supplementary Note 2) The timing controller depicted in Supplementary Note 1, wherein: the reset signal is a signal which includes a trigger part, and starts the reading after prescribed time is passed from the trigger part; and the trigger part of the specific reset signal is outputted earlier than the trigger part of the normal reset signal by an amount of time which corresponds to the reading of the video data corresponding to the specific output terminal.

(Supplementary Note 3) The timing controller depicted in Supplementary Note 1 or 2, wherein an interface standard of the timing controller and the signal-line driving IC is mini-LVDS (Low-Voltage Differential Signaling).

(Supplementary Note 4) An image display device which includes: a display panel including the plurality of signal lines, a plurality of scan lines, pixels formed respectively at intersections between the plurality of scan lines and the plurality of signal lines; a signal-line driving circuit formed with the plurality of signal-line driving ICs; a scan-line driving circuit which outputs a scan signal to the scan lines; and the timing controller depicted in one of Supplementary Notes 1-3.

(Supplementary Note 5) The image display device depicted in Supplementary Note 4, wherein the display panel is a liquid crystal display panel.

(Supplementary Note 6) A reset signal output method used in a timing controller which outputs, via a plurality of ports, video data and a reset signal for starting reading of the video data to a plurality of signal-line driving ICs having output terminals connected to signal lines, and the method includes: storing a plurality of reset signals including a normal reset signal and a specific reset signal; setting one of the plurality of stored reset signals for each of the plurality of ports in accordance with a signal from outside; and synthesizing the set reset signals and the video data, and simultaneously outputting acquired data to the plurality of ports, respectively, in a case where: the plurality of signal-line driving ICs include a normal signal-line driving IC which has only a normal output terminal connected to the signal line and a specific signal-line driving IC which has a specific output terminal that is not connected to the signal line in addition to the normal output terminal; the plurality of ports include a port which does not include the specific signal-line driving IC as an output target, and a port which includes the specific signal-line driving IC as the output target; the reset signals include the normal reset signal that is used when starting reading from the video data corresponding to the normal output terminal, and the specific reset signal which is used when starting reading from the video data corresponding to the specific output terminal; and the specific reset signal is a signal which starts the reading earlier than the normal reset signal by an amount of time which corresponds to the reading of the video data corresponding to the specific output terminal.

(Supplementary Note 7) The reset signal output method depicted in Supplementary Note 6, wherein: the reset signal is a signal which includes a trigger part, and starts the reading after prescribed time is passed from the trigger part; and the trigger part of the specific reset signal is outputted earlier than the trigger part of the normal reset signal by an amount of time which corresponds to the reading of the video data corresponding to the specific output terminal.

(Supplementary Note 8) The reset signal output method depicted in Supplementary Note 6 or 7, wherein an interface standard of the timing controller and the signal-line driving IC is mini-LVDS (Low-Voltage Differential Signaling).

INDUSTRIAL APPLICABILITY

The present invention can be utilized as a timing controller which synthesizes reset signals to video data supplied to signal lines, such as a timing controller used for the signal-line driving ICs compatible with the mini-LVDS interface.

What is claimed is:

1. A timing controller which outputs, via a plurality of ports, video data and a reset signal for starting reading of the video data to a plurality of signal-line driving ICs having output terminals connected to signal lines, the timing controller comprising:

a reset signal storage section which stores a plurality of reset signals including a normal reset signal and a specific reset signal;

a reset signal setting section which sets one of the plurality of reset signals stored in the reset signal storage section for each of the plurality of ports in accordance with a signal from outside; and a reset signal synthesizing section which synthesizes the reset signals set by the reset signal setting section and the video data, and simultaneously outputs acquired data to the plurality of ports, respectively, in a case where:

the plurality of signal-line driving ICs include a normal signal-line driving IC which has only a normal output terminal connected to the signal line and a specific signal-line driving IC which has a specific output terminal that is not connected to the signal line in addition to the normal output terminal;

the plurality of ports include a port which does not include the specific signal-line driving IC as an output target, and a port which includes the specific signal-line driving IC as the output target;

the reset signals include the normal reset signal that is used when starting reading from the video data corresponding to the normal output terminal, and the specific reset signal that is used when starting reading from the video data corresponding to the specific output terminal; and the specific reset signal is a signal which starts the reading earlier than the normal reset signal by an amount of time which corresponds to the reading of the video data corresponding to the specific output terminal.

2. The timing controller as claimed in claim 1, wherein:

the reset signal is a signal which includes a trigger part, and starts the reading after prescribed time is passed from the trigger part; and the trigger part of the specific reset signal is outputted earlier than the trigger part of the normal reset signal by an amount of time which corresponds to the reading of the video data corresponding to the specific output terminal.

3. The timing controller as claimed in claim 1, wherein an interface standard of the timing controller and the signal-line driving IC is mini-LVDS (Low-Voltage Differential Signaling).

4. An image display device, comprising:

a display panel including the plurality of signal lines, a plurality of scan lines, pixels formed respectively at intersections between the plurality of scan lines and the plurality of signal lines;

a signal-line driving circuit formed with the plurality of signal-line driving ICs;

a scan-line driving circuit which outputs a scan signal to the scan lines; and the timing controller of claim 1.

5. The image display device as claimed in claim 4, wherein the display panel is a liquid crystal display panel.

6. A reset signal output method used in a timing controller which outputs, via a plurality of ports, video data and a reset signal for starting reading of the video data to a plurality of signal-line driving ICs having output terminals connected to signal lines, the method comprising:

storing a plurality of reset signals including a normal reset signal and a specific reset signal;

setting one of the plurality of stored reset signals for each of the plurality of ports in accordance with a signal from outside; and synthesizing the set reset signals and the video data, and simultaneously outputting acquired data to the plurality of ports, respectively, in a case where:

the plurality of signal-line driving ICs include a normal signal-line driving IC which has only a normal output terminal connected to the signal line and a specific signal-line driving IC which has a specific output terminal that is not connected to the signal line in addition to the normal output terminal;

the plurality of ports include a port which does not include the specific signal-line driving IC as an output target, and a port which includes the specific signal-line driving IC as the output target;

the reset signals include the normal reset signal that is used when starting reading from the video data corresponding to the normal output terminal, and the specific reset signal which is used when starting reading from the video data corresponding to the specific output terminal; and the specific reset signal is a signal which starts the reading earlier than the normal reset signal by an amount of time which corresponds to the reading of the video data corresponding to the specific output terminal.

7. The reset signal output method as claimed in claim 6, wherein:

the reset signal is a signal which includes a trigger part, and starts the reading after prescribed time is passed from the trigger part; and the trigger part of the specific reset signal is outputted earlier than the trigger part of the normal reset signal by an amount of time which corresponds to the reading of the video data corresponding to the specific output terminal.

8. The reset signal output method as claimed in claim 6, wherein an interface standard of the timing controller and the signal-line driving IC is mini-LVDS (Low-Voltage Differential Signaling).

9. A timing controller which outputs, via a plurality of ports, video data and a reset signal for starting reading of the video data to a plurality of signal-line driving ICs having output terminals connected to signal lines, the timing controller comprising:

reset signal storage means for storing a plurality of reset signals including a normal reset signal and a specific reset signal;

reset signal setting means for setting one of the plurality of reset signals stored in the reset signal storage means for each of the plurality of ports in accordance with a signal from outside; and reset signal synthesizing means for synthesizing the reset signals set by the reset signal setting means and the video data, and simultaneously outputting acquired data to the plurality of ports, respectively, in a case where:

the plurality of signal-line driving ICs include a normal signal-line driving IC which has only a normal output terminal connected to the signal line and a specific signal-line driving IC which has a specific output terminal that is not connected to the signal line in addition to the normal output terminal;

the plurality of ports include a port which does not include the specific signal-line driving IC as an output target, and a port which includes the specific signal-line driving IC as the output target;

the reset signals include the normal reset signal that is used when starting reading from the video data corresponding to the normal output terminal, and the specific reset signal that is used when starting reading from the video data corresponding to the specific output terminal; and the specific reset signal is a signal which starts the reading earlier than the normal reset signal by an amount of time which corresponds to the reading of the video data corresponding to the specific output terminal.

* * * * *